United States Patent [19]
Rau

[11] Patent Number: 4,812,348
[45] Date of Patent: Mar. 14, 1989

[54] TORSION-STRESSED COMPONENT PART OF SUPERPOSED FIBER LAYERS

[75] Inventor: Thomas Rau, Liebenau, Fed. Rep. of Germany

[73] Assignee: Volkswagen AG, Fed. Rep. of Germany

[21] Appl. No.: 57,282

[22] Filed: Jun. 2, 1987

[30] Foreign Application Priority Data

Jun. 11, 1986 [DE] Fed. Rep. of Germany ....... 3619602

[51] Int. Cl.$^4$ ............................ F16L 9/14; B32B 5/12
[52] U.S. Cl. .................................... 428/113; 138/140; 138/153; 428/109; 428/217; 428/292; 428/521; 428/284; 428/36.3; 428/36.4
[58] Field of Search ................. 428/36, 109, 113, 217, 428/292, 521, 284; 138/124, 126, 140, 141, 153

[56] References Cited

U.S. PATENT DOCUMENTS

| | | | |
|---|---|---|---|
| 4,111,237 | 9/1978 | Mutzner | 138/126 |
| 4,431,031 | 2/1984 | Ettlinger | 138/124 |
| 4,585,035 | 4/1986 | Piccoli | 138/126 |
| 4,662,405 | 5/1987 | Besche et al. | 138/124 |

*Primary Examiner*—Ellis P. Robinson
*Assistant Examiner*—James J. Seidleck
*Attorney, Agent, or Firm*—Brumbaugh, Graves, Donohue & Raymond

[57] ABSTRACT

In order to increase resistance to fatigue which is decreased by crack formation in at least one fiber layer of a torsion-stressed component part, an intermediate layer of a material which is soft relative to the fiber layers is arranged between individual fiber layers.

6 Claims, 1 Drawing Sheet

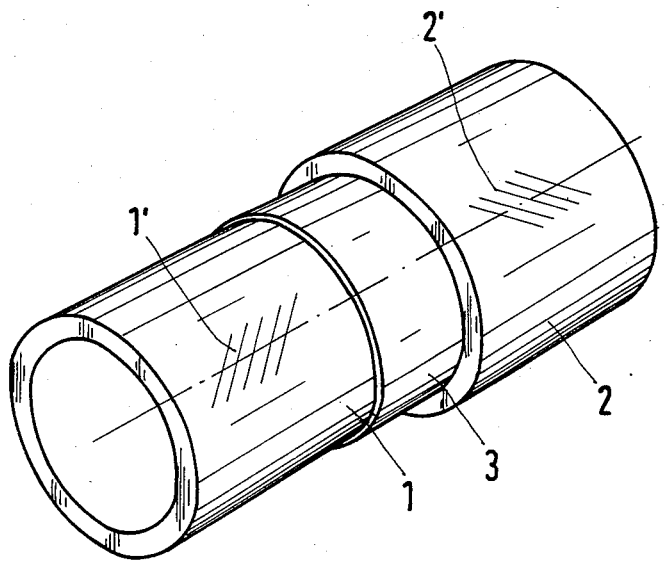

TORSION-STRESSED COMPONENT PART OF SUPERPOSED FIBER LAYERS

BACKGROUND OF THE INVENTION

The invention relates to a torsion-stressed component part, in particular a hollow shaft, which is made of a plurality of fiber layers with different fiber orientations arranged one on top of the other and connected in a thrust-transmitting manner.

It is known that it is of interest, in particular for reasons of weight reduction and decreasing sound transmission, to substitute customary metal torsion tubes, such as those used, for example, as drive shafts in automobiles, with hollow shafts which are composed of a plurality of superposed fiber-plastic layers. The fibers, which way, for example, be carbon fibers, of the superposed layers thereby have differently oriented alignments.

It has been found that with the presence of increasing and fluctuating stresses, cracks form in some fiber layers of component parts of this kind at relatively low stresses. The cracks are stopped, as it were, at the boundaries with adjacent fiber layers which, as stated above, have a different fiber alignment. However, in the region of the crack points excessive mechanical stress will occur resulting in premature fatigue of the fibers.

SUMMARY OF THE INVENTION

It is an object of the invention to provide a torsion-stressed component part as discussed above by simple structural means in such a manner that an increase in fatigue resistance of the component part relative to the state of the art described will result.

The torsion stressed component part generally comprises a plurality of superposed fiber layers which are connected in a thrust-transmitting manner. By trust-transmitting it should be understood that the "thrust" is not limited to forces and stresses which are parallel to the axis of the shaft of the surface of the fiber layers, but also to those forces and stress which are otherwise, for instance tangentially, oriented to the surface of the fiber layers. So thrust transmitting means the same as shearing stress-transmitting.

Pursuant to this object, and others which will become apparent hereafter, one aspect of the present invention resides in an intermediate layer, composed of a material softer than the fiber layers, arranged at least between some of the directly superposed fiber layers.

Tests have shown that such a "crack-stopping" intermediate layer decreases in an advantageous manner the notch stress condition in the region of the crack points so that the fatigue resistance of the torsion-stressed component part constructed in this manner is considerably increased.

BRIEF DESCRIPTION OF THE DRAWING

The single FIGURE illustrates an embodiment of the invention for use as a drive shaft of an automobile which, as is known, extends between a drive assembly and a differential gear unit.

DETAILED DESCRIPTION OF THE PREFERRED EMBODIMENT

As seen from the drawing, between two plastic-fiber layers 1 and 2, whose different fiber alignments are indicated by 1' and 2', is arranged an intermediate layer 3 which in this embodiment is a rubber foil. The intermediate layer may also be a fleece-like material. The intermediate layer 3 may be joined by cement with the adjacent fiber layers 1 and 2 in a laminar manner. The fibers in the plastic-fiber layers may, for example, be carbon fibers.

Thus, the invention creates a structurally very simple arrangement for increasing the resistance to fatigue of a component part made of fiber-reinforced plastics, e.g., a torsion tube, without impairment of the advantages of such a component part.

While the invention has been illustrated and described as embodied in a torsion-stressed component part of superposed fiber layers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A torsion-stressed component part comprising a plurality of superposed rigid fiber-containing layers with fibers oriented in different directions, respectively, and an intermediate layer composed of a material which is soft relative to the fiber layers arranged between at least two superposed fiber-containing layers to join them in force-transmitting relation.

2. A component part as defined in claim 1, wherein the intermediate layer is a foil of rubber-like material.

3. A component part as defined in claim 1, wherein the intermediate layer is joined in a laminar manner with the adjacent fiber containing layers.

4. A component part as defined in claim 3, wherein the intermediate layer is cemented to the adjacent fiber containing layers.

5. A component part as defined in claim 1, wherein the intermediate layer is a fleece-like material.

6. A torsion-stressed component part, comprising: a plurality of superposed rigid fiber-containing layers, the fiber-containing layers of said plurality which are directly superposed upon one another having fiber orientations which differ; and an intermediate layer, of a material which is softer than the fiber-containing layers, arranged between at least two directly superposed fiber-containing layers to join them in force-transmitting relation.

* * * * *